United States Patent
Jo

(10) Patent No.: US 11,707,958 B2
(45) Date of Patent: Jul. 25, 2023

(54) INSULATOR FOR VEHICLE SUSPENSION AND MANUFACTURING METHOD THEREOF

(71) Applicants: Hyundai Motor Company, Seoul (KR); Kia Motors Corporation, Seoul (KR)

(72) Inventor: Gi Bong Jo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 503 days.

(21) Appl. No.: 16/928,805

(22) Filed: Jul. 14, 2020

(65) Prior Publication Data

US 2021/0291604 A1 Sep. 23, 2021

(30) Foreign Application Priority Data

Mar. 23, 2020 (KR) ........................ 10-2020-0035069

(51) Int. Cl.
*B60G 13/00* (2006.01)
*F16F 1/37* (2006.01)
(Continued)

(52) U.S. Cl.
CPC .......... *B60G 13/003* (2013.01); *F16F 1/3732* (2013.01); *F16F 1/3842* (2013.01);
(Continued)

(58) Field of Classification Search
CPC ............ B60G 13/003; B60G 2202/143; B60G 2204/128; B60G 2204/41; B60G 2204/43;
(Continued)

(56) References Cited

U.S. PATENT DOCUMENTS 2,873,980 A * 2/1959 Thomas .................. B60G 7/00
280/124.134
2,913,251 A * 11/1959 Herbenar ................ F16C 11/04
280/93.508
(Continued)

FOREIGN PATENT DOCUMENTS

JP 6-69469 U 9/1994
JP H 08291838 A 11/1996
(Continued)

*Primary Examiner* — Thomas J Williams
*Assistant Examiner* — James K Hsiao
(74) *Attorney, Agent, or Firm* — Morgan, Lewis & Bockius LLP

(57) ABSTRACT

An insulator for a vehicle suspension and a method of manufacturing the same, may include an insulator having a housing which is configured to be engaged with a vehicle body and in which a hook protrusion is formed to protrude from an upper end opening of the housing; a bush which is configured to be engaged with a piston rod of a shock absorber, wherein a vibration-proof rubber, a core, and an outer pipe are integrally mounted in the bush, and wherein the bush is press-inserted into and fixed in an inner space of the housing so that the bush becomes hooked upward to the hook protrusion; and a fixing plate press-inserted into and fixed in the inner space of the housing so that the fixing plate is in contact with a lower end portion of the bush and supports the bush from a lower side thereof.

14 Claims, 6 Drawing Sheets

(51) Int. Cl.
*F16F 1/38* (2006.01)
*F16F 9/54* (2006.01)
*F16F 1/373* (2006.01)

(52) U.S. Cl.
CPC .............. *F16F 1/3863* (2013.01); *F16F 9/54* (2013.01); *B60G 2202/143* (2013.01); *B60G 2204/128* (2013.01); *B60G 2204/41* (2013.01); *B60G 2204/43* (2013.01); *B60G 2204/45* (2013.01); *B60G 2206/73* (2013.01); *B60G 2206/82092* (2013.01); *F16F 2226/045* (2013.01)

(58) Field of Classification Search
CPC ............ B60G 2204/45; B60G 2206/73; B60G 2206/82092; F16F 1/3732; F16F 1/3842; F16F 1/3863; F16F 9/54; F16F 2226/045
See application file for complete search history.

(56) References Cited

U.S. PATENT DOCUMENTS

| | | | | |
|---|---|---|---|---|
| 4,101,227 A * | 7/1978 | Herbenar | ................. | B62D 7/16 280/93.508 |
| 4,603,459 A * | 8/1986 | Buchanan | ............. | F16C 23/041 29/434 |
| 4,690,418 A * | 9/1987 | Smith | .................... | F16C 25/02 280/93.512 |
| 4,921,203 A * | 5/1990 | Peterson | ............... | B62D 27/04 267/141.1 |
| 5,040,775 A * | 8/1991 | Miyakawa | .............. | F16F 13/16 267/140.13 |
| 5,158,269 A * | 10/1992 | Hein | ....................... | F16F 3/093 267/141.1 |
| 5,165,669 A * | 11/1992 | Mayerbock | ............ | F16F 13/24 267/219 |
| 5,178,433 A * | 1/1993 | Wagner | .................... | F16F 1/44 403/224 |
| 5,467,970 A * | 11/1995 | Ratu | ........................ | B60G 7/04 267/152 |
| 5,595,374 A * | 1/1997 | Charette | ................. | F16F 13/20 267/140.14 |
| 5,678,810 A * | 10/1997 | Summers, III | ........ | F16F 9/0454 267/64.28 |
| 5,799,930 A * | 9/1998 | Willett | .................... | F16F 3/093 267/141.5 |
| 6,290,218 B1 * | 9/2001 | Mayerbock | .......... | B60G 15/067 280/124.147 |
| 6,305,699 B1 * | 10/2001 | Konig | .................... | B60G 7/001 280/124.133 |
| 7,350,779 B2 * | 4/2008 | Tamura | ................. | B60G 15/067 188/321.11 |
| 7,938,418 B1 * | 5/2011 | Coombs | ............... | B60G 15/068 280/124.147 |
| 8,070,144 B2 * | 12/2011 | Lamb | ..................... | B60G 11/22 267/220 |
| 8,246,021 B2 * | 8/2012 | Shand | .................. | B60G 99/002 267/141.1 |
| 8,556,281 B2 * | 10/2013 | Lee | ....................... | B60G 13/003 280/124.147 |
| 8,960,696 B2 * | 2/2015 | McMullen | ........... | B60G 15/067 267/220 |
| 9,038,997 B2 * | 5/2015 | Bradshaw | ............... | F16F 13/16 296/190.07 |
| 9,132,709 B2 * | 9/2015 | Endo | .................... | B60G 13/003 |
| 9,308,795 B2 * | 4/2016 | Matsushita | .......... | B60G 15/067 |
| 9,428,021 B2 * | 8/2016 | Gollapalli | ........... | B60G 13/005 |
| 9,765,845 B2 * | 9/2017 | Bradshaw | ............... | F16F 13/10 |
| 9,829,036 B2 * | 11/2017 | Kondor | .................... | F16F 9/54 |
| 10,532,621 B2 * | 1/2020 | Sasaki | ...................... | B60G 7/02 |
| 11,472,280 B2 * | 10/2022 | Gutierrez | ................ | F16F 15/08 |
| 2002/0135111 A1 * | 9/2002 | Bishop | ................. | B60G 15/068 267/64.11 |
| 2004/0012136 A1 * | 1/2004 | Mennesson | .......... | B60G 15/065 267/219 |
| 2005/0133322 A1 * | 6/2005 | Huprikar | .............. | B60G 15/067 188/321.11 |
| 2005/0155829 A1 * | 7/2005 | Germano | .............. | B60G 15/068 188/321.11 |
| 2005/0280195 A1 * | 12/2005 | Huprikar | ................ | F16F 1/37 267/141.1 |
| 2006/0043659 A1 * | 3/2006 | Gofron | .................... | F16F 9/58 267/220 |
| 2006/0151928 A1 * | 7/2006 | Tamura | ................ | B60G 13/003 267/219 |
| 2006/0279031 A1 * | 12/2006 | Schleck | ..................... | F16F 9/58 267/220 |
| 2012/0049428 A1 * | 3/2012 | Moore | ..................... | F16F 13/14 267/220 |
| 2015/0158362 A1 * | 6/2015 | Palka | ..................... | B60G 15/06 267/30 |
| 2017/0067528 A1 * | 3/2017 | Asaoka | ................. | B60G 13/003 |
| 2018/0024418 A1 | 1/2018 | Clark | | |
| 2018/0244118 A1 * | 8/2018 | Sasaki | ...................... | B60G 3/20 |
| 2018/0370316 A1 * | 12/2018 | Priess | .................... | F16F 9/0454 |
| 2019/0293147 A1 * | 9/2019 | Shinkawa | .............. | F16F 15/04 |
| 2020/0062062 A1 * | 2/2020 | Jeong | .................. | B60G 15/067 |
| 2020/0164708 A1 * | 5/2020 | Lim | ....................... | B60G 15/068 |
| 2020/0269646 A1 * | 8/2020 | Otsu | ........................ | F16F 3/093 |
| 2020/0406515 A1 * | 12/2020 | Lim | ........................ | B60G 15/04 |
| 2021/0148407 A1 * | 5/2021 | Werner | ................. | F16F 1/3814 |

FOREIGN PATENT DOCUMENTS

| | | |
|---|---|---|
| KR | 2010-0088808 A | 8/2010 |
| KR | 101385113 B1 | 4/2014 |

* cited by examiner

[ WEDGE TYPE ]

[ PROTRUSION TYPE ]

[ IRREGULAR TYPE ]

(a)

(b)

INSULATOR FOR VEHICLE SUSPENSION AND MANUFACTURING METHOD THEREOF

CROSS-REFERENCE TO RELATED APPLICATION

The present application claims priority to Korean Patent Application No. 10-2020-0035069 filed on Mar. 23, 2020, the entire contents of which is incorporated herein for all purposes by this reference.

BACKGROUND OF THE INVENTION

Field of the Invention

The present invention relates to an insulator for a vehicle suspension and a method of manufacturing the same. More particularly, it relates to an insulator for a vehicle suspension and a method of manufacturing the same, which are capable of omitting a curling process during manufacturing and reducing a production cost and a weight.

Description of Related Art

Generally, a suspension of a vehicle is a device which connects an axle to a vehicle body and prevents a vibration or an impact from a road surface from being directly transmitted from a wheel to a vehicle body when the vehicle is driving, thereby preventing damage to the vehicle body and improving ride comfort.

A known suspension includes a strut in which a shock absorber is embedded, a spring, an insulator, a bump stopper, and the like, and the shock absorber is integrally mounted with the spring or disposed at a position in proximity to the shock absorber, thereby absorbing and attenuating an impact or a natural vibration, which is applied to the spring while the vehicle is driving, to serve to improve ride comfort, and simultaneously, reduce fatigue of the spring.

A piston rod of the absorber is coupled to the vehicle body via an insulator. In an upper structure of the strut including the absorber, an upper end portion of the strut, an upper end portion of the piston rod of the shock absorber is engaged with the insulator fixed to the vehicle body.

Thus, the upper end portion of the strut may be supported due to the insulator in a state of being insulated from the vehicle body.

In the insulator, a bolt inserted into a mounting hole of a housing is engaged with the vehicle body so that the housing is fixed to the vehicle body, and the piston rod of the shock absorber is inserted into to vertically pass through the housing.

In the present case, insulator rubber for insulation is integrally fixed in an inner space of the housing, and a core is integrally mounted in the insulator rubber so that the core is supported on an inner surface of the housing via the insulator rubber.

The piston rod is coupled to pass through the core supported due to the insulator rubber in the inner space of the housing, and a nut member is engaged with the upper end portion of the piston rod passing through the core, and thus the upper end portion of the piston rod is coupled to the core of the insulator.

Meanwhile, insulators of various configurations are known. Recently, the most widely used insulator is a dual path insulator in which a housing is made of an expensive aluminum alloy, and the insulator has excellent performance but has a disadvantage of a high price.

Furthermore, the conventional insulator in which a housing is made of metal has a problem of requiring a curling process for the housing during manufacturing and a problem that damage to a curled portion may occur.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an insulator for a vehicle suspension and a method of manufacturing the same, which are capable of omitting a curling process during manufacturing and reducing a production cost and a weight.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

In an exemplary embodiment of the present invention, various aspects of the present invention provide an insulator for a vehicle suspension including a housing which is configured to be engaged with a vehicle body and in which a hook protrusion is formed to protrude from an upper end opening of the housing; a bush which is configured to be engaged with a piston rod of a shock absorber, wherein a vibration-proof rubber, a core, and an outer pipe are integrally mounted in the bush, and wherein the bush is press-inserted into and fixed in an inner space of the housing so that the bush becomes hooked upward to the hook protrusion; and a fixing plate press-inserted into and fixed in the inner space of the housing so that the fixing plate is in contact with a lower end portion of the bush and supports the bush from a lower side thereof.

In another exemplary embodiment of the present invention, various aspects of the present invention provide a method of manufacturing an insulator for vehicle suspension, which includes providing a housing in which a hook protrusion is formed to protrude from an upper end opening of the housing; press-inserting a bush, which is configured such that a vibration-proof rubber, a core, and an outer pipe are integrally mounted, through a bottom end opening of the housing from bottom to top of the housing and fixing the bush in an inner space of the housing to be engaged upward to the hook protrusion; and press-inserting a fixing plate through the bottom end opening of the housing from bottom to top of the housing and fixing the fixing plate in the inner space of the housing so that the fixing plate is in contact with a lower end portion of the bush and supports the bush therebelow.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
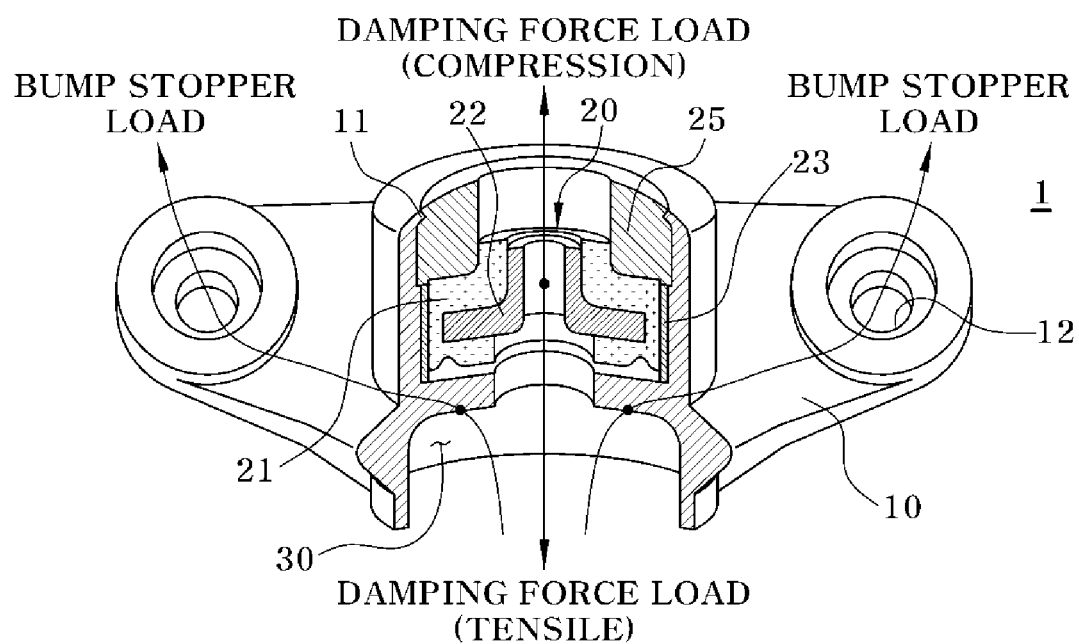
FIG. 1 is a cross-sectional perspective view illustrating a conventional dual path insulator.

It should be understood that the appended drawings are not necessarily to scale, presenting a somewhat simplified representation of various exemplary features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment of the present invention will be fully described in a detail which is suitable for implementation by those skilled in the art to which an exemplary embodiment of the present invention pertains with reference to the accompanying drawings. However, the present invention is not limited to the exemplary embodiment disclosed herein and may be implemented in other forms.

Throughout this specification, when an element is referred to as "comprising" a component, it means that the element can further include other components, not excluding the other components unless stated otherwise.

First, to help understanding of the present invention, a configuration of a conventional dual path insulator will be briefly described.

FIG. 1 is a cross-sectional perspective view illustrating a conventional dual path insulator. As shown in the drawing, a conventional insulator 1 includes a housing 10, a bush 20, and an upper cap 25.

The housing 10 is configured as a bracket for being engaged with a vehicle body. A mounting hole 12 for bolt engagement with the vehicle body is formed in the housing 10, and a bolt inserted into the mounting hole 12 is engaged with the vehicle body so that an entirety of the insulator 1 including the housing 10 may be fixed to the vehicle body.

The bush 20 is fixed in an inner space of the housing 10. The bush 20 includes a vibration-proof rubber 21, a core 22, and an outer pipe 23, and the upper cap 25 is inserted into the inner space of housing 10 and fixed to an upper side of the bush 20.

To more describe the bush 20, the vibration-proof rubber 21 for insulation is fixed in the inner space of housing 10, and the core 22 is integrally coupled to the vibration-proof rubber 21 so that the core 22 is supported on an inner surface of the housing 10 via the vibration-proof rubber 21.

A piston rod is coupled to pass through the core 22 in the inner space of the housing 10. A nut member is engaged with an upper end portion of the piston rod passing through the core 22, and thus the upper end portion of the piston rod becomes in a state of being coupled to the core 22 of the insulator 1.

In FIG. 1, a reference numeral 30 denotes a bump stopper space in which a bump stopper is located, and a reference numeral 11 denotes a curling portion formed by curling an upper end portion of the housing 10 to prevent separation of the bush 20 and the upper cap 25.

A load acting on a typical insulator is classified into a damping force load due to a damping force of the shock absorber and a bump stopper load generated due to a bump stopper.

In the conventional insulator 1, the bump stopper load is transferred to a path of the bump stopper located in the bumper stopper space 30→the housing 10→the vehicle body, and the damping force load is transferred to a path of the piston rod→the core 22→the vibration-proof rubber 21→the outer pipe 23→the upper cap 25→the housing 10→the vehicle body (see arrows in FIG. 1).

In the present case, as shown in FIG. 1, when a damping force load occurs, the damping force load (tensile) acts downwardly from the bush 20, and the damping force load (compression) acts upwards from the bush 20 so that the damping force load (compression) acts in a direction in which the upper cap 25 is separated.

In the conventional insulator 1, when mounted, a process of press-inserting the bush 20 and the upper cap 25 from top to bottom and curling the upper end portion of the housing 10 after press-inserting the upper cap 25 to allow the upper cap 25 to withstand the damping force load (compression)

acting in the separation direction of the upper cap 25 while preventing separation of the bush 20 and the upper cap 25 is indispensably performed.

As described above, in the conventional insulator 1, when a damping force load occurs, the damping force load (compression) acts in a direction of separating the upper cap 25. When curling quality is not properly secured and the damping force load (compression) acts, the upper cap 25 may be separated or the curling portion 11 may be damaged.

Furthermore, in the conventional insulator 1, since the housing 10 is made of an aluminum alloy, there is a disadvantage that a price is Thus, an insulator for a vehicle suspension and a method of manufacturing the same, which are capable of solving a problem of a method of supporting a bush and an upper cap using a curling portion of a housing and reducing a production cost and a weight, are disclosed herein.

Hereinafter, a configuration of an insulator according to an exemplary embodiment of the present invention and a method of manufacturing the same will be described.

Figure 2:
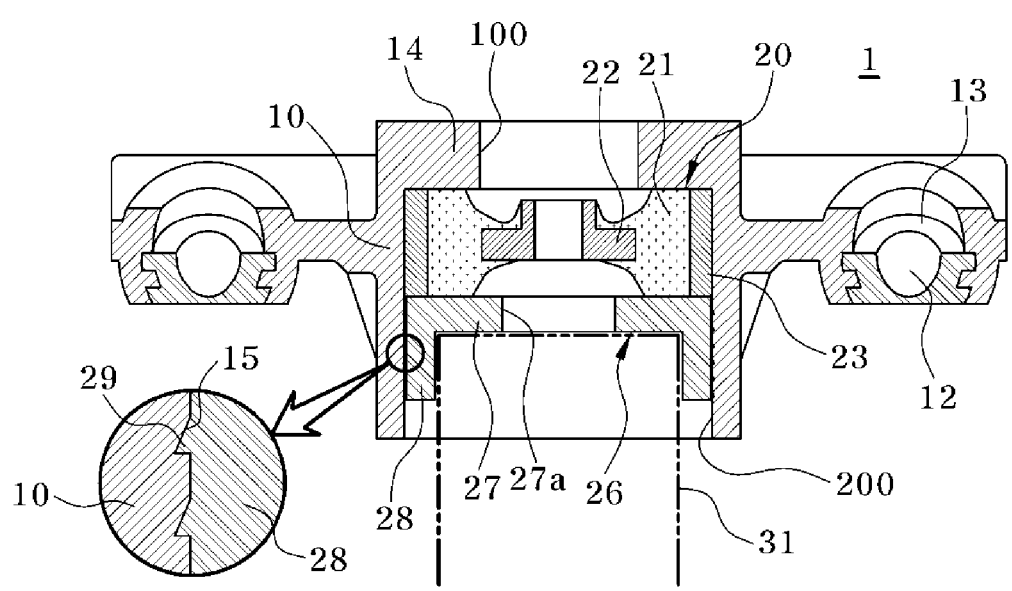
FIG. 2 is a cross-sectional view illustrating an internal configuration of an insulator according to an exemplary embodiment of the present invention.

FIG. 2 is a cross-sectional view illustrating an internal configuration of an insulator according to an exemplary embodiment of the present invention.

As shown in the drawing, an insulator 1 according to an exemplary embodiment of the present invention includes a housing 10, a bush 20, and a fixing plate 26.

The housing 10 is configured as a bracket for being engaged with a vehicle body. A plurality of mounting holes 12 for bolt engagement with the vehicle body are formed in the housing 10, and a washer 13 made of a metal material, such as steel or an alloy, is mounted in each of the plurality of mounting holes 12.

As described above, a bolt is inserted into the mounting hole 12, in which the washer 13 is mounted, to be engaged with the vehicle body so that an entirety of the insulator 1 including the housing 10 is fixed to the vehicle body.

The bush 20 is fixed in an inner space of the housing 10. The bush 20 includes a vibration-proof rubber 21, a core 22, and an outer pipe 23, and the fixing plate 26 is press-inserted into and fixed in an inner space of housing 10 below the bush 20.

To more describe the bush 20, the vibration-proof rubber 21 for insulation is integrally fixed in the inner space of housing 10, and the core 22 is integrally mounted in the vibration-proof rubber 21 so that a structure, in which the core 22 is supported on an inner surface of the housing 10 via the vibration-proof rubber 21, is formed.

Furthermore, the outer pipe 23 is integrally coupled and fixed to an outer surface of the vibration-proof rubber 21.

In the inner space of the housing 10, a piston rod is coupled to pass through the core 22 supported due to the vibration-proof rubber 21, and a nut member is engaged with an upper end portion of the piston rod passing through the core 22 so that the upper end portion of the piston rod is coupled to the core 22 of the insulator 1.

The fixing plate 26 is mounted in the inner space of the housing 10 in the form of an inverted cup below the bush 20 and includes an upper surface portion 27 which is a portion horizontally mounted to support the bush 20 in the inner space of the housing 10 in a state of being in contact with a lower surface of the bush 20, and a side surface portion 28 integrally formed to extend downwardly from a circumferential portion of the upper surface portion 27 and coupled to the housing 10 in a state of being in close contact with an inner surface of the housing 10.

In the exemplary embodiment of the present invention, the fixing plate 26 may be formed to have a circular cup shape. A hole 27a is formed at a center portion of the upper surface portion 27 of the fixing plate 26 to allow the piston rod to pass therethrough, and an outer circumferential surface of the side surface portion 28 of the fixing plate 26 is fixed to the housing 10 in a state of being in close contact with an inner circumferential surface of the housing 10.

Meanwhile, in the exemplary embodiment of the present invention, a hook protrusion 14 having a shape protruding toward an inner side of the housing 10 is formed in an upper end opening 100 of the housing 10, and the bush 20 is press-inserted into the inner space of the housing 10 from bottom to top.

In the present case, the bush 20 is inserted into the inner space of the housing 10 through a lower end opening 200 of the housing 10 and press-inserted from bottom to top. After the bush 20 is press-inserted, the bush 20 is caught upward to the hook protrusion 14 thereabove in the inner space of the housing 10 to become a state of being supported on the hook protrusion 14.

In the exemplary embodiment of the present invention, the housing 10 may be made of an alloy metal, and preferably, may be formed by being molded with a synthetic resin such as plastic, and the core 22 may be made of a metal material such as steel or an alloy.

Furthermore, the outer pipe 23 integrally coupled with the vibration-proof rubber 21 may be formed by being molded with a synthetic resin such as plastic, and the fixing plate 26 may also be formed by being molded with a synthetic resin such as plastic.

After the bush 20 is press-inserted from bottom to top of the housing through the lower end opening of the housing 10 and fixed in the inner space of the housing 10, the fixing plate 26 is similarly press-inserted from bottom to top of the housing toward a lower side of the bush 20 through the lower end opening of the housing 10 to be fixed in the inner space of the housing 10.

The fixing plate 26 supports the bush 20 from the lower side thereof in the inner space of the housing 10 and prevents the bush 20 from being separated downward.

After all the housing 10, the bush 20, and the fixing plate 26 are mounted, a bump stopper space (see the reference numeral 30 in FIG. 1) may be secured below the fixing plate 26, and a bump stopper 31 is mounted to be located in the bump stopper space.

A very large load is input due to the bump stopper 31 through the bump stopper space of insulator 1. The very large load is transferred through a path of the bump stopper 31→the outer pipe 23→the housing 10→the washer 13→the vehicle body.

In the exemplary embodiment of the present invention, after the fixing plate 26 is press-inserted into the housing 10, to definitely prevent separation of the fixing plate 26, a protrusion 29 is formed on a surface on which the fixing plate 26 is in contact with the housing 10, that is, on the outer circumferential surface of the side surface portion 28 of the fixing plate 26.

In the present case, a plurality of protrusions 29 are formed to be uniformly distributed on the outer circumferential surface of the side surface portion 28 of the fixing plate 26.

Thus, when the fixing plate 26 is press-inserted into the inner space of the housing 10, the fixing plate 26 may be press-inserted into and fixed in the inner space of the housing 10 in a wedge structure due to the protrusions 29.

Furthermore, after the fixing plate 26 is press-inserted into the inner space of the housing 10, a bonding force and bonding strength between the housing 10 and the fixing plate 26 may be significantly increased due to the protrusions 29.

As described above, in the exemplary embodiment of the present invention, the protrusions 29 may be formed on the outer circumferential surface of the side surface portion 28 of the fixing plate 26. In the present case, a plurality of concave grooves 15 may be formed to be uniformly distributed on a surface of the housing 10 with which a surface of the fixing plate 26 is in contact, that is, on an inner circumferential surface of the housing 10 with which the outer circumferential surface of the side surface portion 28 of the fixing plate 26 is in contact.

Thus, in a state in which the fixing plate 26 is press-inserted into the inner space of the housing 10, the housing 10 and the fixing plate 26 are capable of being maintained in a securely coupled state due to irregularity structures of the protrusions 29 and the concave grooves 15, and thus the fixing plate 26 is capable of being definitely prevented from being separated from the inner space of the housing 10.

Thus, unlike the conventional insulator in which the housing is made of a metal such as an aluminum alloy or steel, in an exemplary embodiment of the present invention, since the housing is manufactured by being molded with synthetic resin, there is an advantage of weight reduction as well as cost reduction as compared with the conventional insulator.

Furthermore, after the hook protrusion 14 is formed at the upper end portion of the housing 10, since the bush 20 is press-inserted into the inner space of the housing 10 through the lower end opening of the housing 10 from bottom to top, the conventional curling process may be omitted, and it is possible to fix the bush 20 by press-inserting the fixing plate 26 into the housing 10 below the bush 20 without a separate curling process.

Consequently, a problem that the bush is separated or a housing portion is damaged due to the damping force load (compression) as in the related art may be prevented.

As described above, in the insulator 1 according to the exemplary embodiment of the present invention, the bump stopper load is transferred through the path of the bump stopper 31→the outer pipe 23→the housing 10→the washer 13→the vehicle body.

Furthermore, the damping force load (compression) is transferred through the path of the piston rod→the core 22→the vibration-proof rubber 21→the outer pipe 23→the housing 10→the vehicle body, and the damping force load (tensile) is transferred through the path of the piston rod→the core 22→the vibration-proof rubber 21→the outer pipe 23→the fixing plate 26→the housing 10→the vehicle body.

According to such load transfer paths, when a damping force load is generated in a center portion of the bush 20 in the insulator 1, since the damping force load (compression) is directly transferred from the bush 20 to the housing 10, the insulator 1 may securely tolerate with respect to the damping force load (compression).

Meanwhile, the damping force load (tensile) acts downwardly from the center portion of the bush 20. In the present case, the damping force load (tensile) is transferred to the housing 10 via the fixing plate 26, and the damping force load (tensile) acts in the separation direction of the fixing plate 26.

However, on the other hand, since the bump stopper load continuously acts in a direction of pressing the fixing plate 26 to prevent the separation of the fixing plate 26 so that it is possible to structurally prevent the separation of the fixing plate 26.

Figure 3:
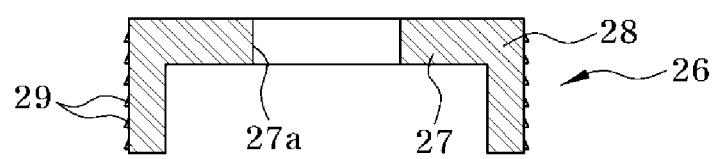
FIG. 3 is a cross-sectional view illustrating various examples of a fixing plate in the insulator according to the exemplary embodiment of the present invention.
Figure 3:
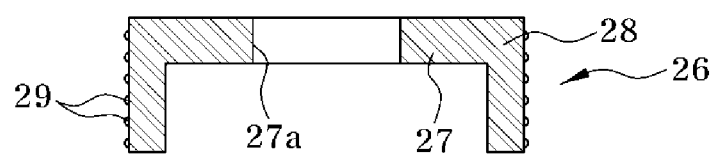
Figure 3:
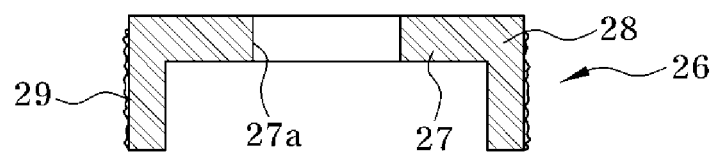

FIG. 3 is a cross-sectional view illustrating the fixing plate in the insulator according to the exemplary embodiment of the present invention that illustrates various examples in which the protrusions 29 are formed on the outer circumferential surface of the side surface portion 28 of the fixing plate 26.

Although the plurality of concave grooves 15 have been referred to as being formed on the inner circumferential surface of the housing 10, a plurality of protrusions may be formed on the inner circumferential surface of the housing 10 instead of the plurality of concave grooves 15. In the present case, a plurality of protrusions or a plurality of concave grooves may be formed on the outer circumferential surface of the side surface portion 28 of the fixing plate 26.

Furthermore, as described above, the protrusions or the concave grooves 15 may be formed on the inner circumferential surface of the housing 10 as well as concave grooves or protrusions 3, which have a shape opposite to that of the surface in contact with the inner circumferential surface of the housing 10, may be formed in a mold 2 for molding the housing 10.

In FIG. 3, a "wedge type" and a "protrusion type" are different protrusion shapes. The "wedge type" may be a protrusion having a pointed end portion, the "protrusion type" may be a protrusion of an approximately hemispherical shape as shown in the drawing, and these are examples in which protrusions are regularly formed on a surface. An "irregular type" may have a structure in which irregularities are irregularly disposed on a surface together with protrusions.

Furthermore, when the mold 2 is separated from the housing 10 of the molded insulator 1, that is, when the mold 2 is moved downwards and separated from the inner space of the housing 10, the mold 2 in contact with the inner surface of the housing 10 should be smoothly separated from the housing 10.

However, when an entirety of a lower region, in which the inner circumferential surface (inner surface) of the housing 10 is in contact with the outer circumferential surface (outer surface) of the side surface portion 28 of the fixing plate 26, is molded in a cylindrical shape with the same inner diameter, owing to a groove-protrusion structure between the inner surface of the molded housing 10 in the lower region and a surface of the mold 2, it is difficult to separate the mold 2 from the molded housing 10, and even when the mold 2 is separated from the molded housing 10, the protrusions or the concave grooves 15 formed on the inner surface of housing 10 in the lower region may be damaged.

That is, when the inner surface of the housing 10 is molded, since the protrusion 3 becomes a state of being inserted into a corresponding concave groove 15 on the inner surface of the molded housing 10 in the lower region and the surface of the mold 2, and the protrusions or the concave grooves 15 of the housing 10 are engaged with the concave grooves or the protrusions 3, which have an opposite shape of the mold 2, to be hooked thereto, when the mold 2 is pulled out from the inner space of the housing 10, the protrusions or the concave grooves 15 formed on the inner surface of the housing 10 may be damaged.

Figure 4:
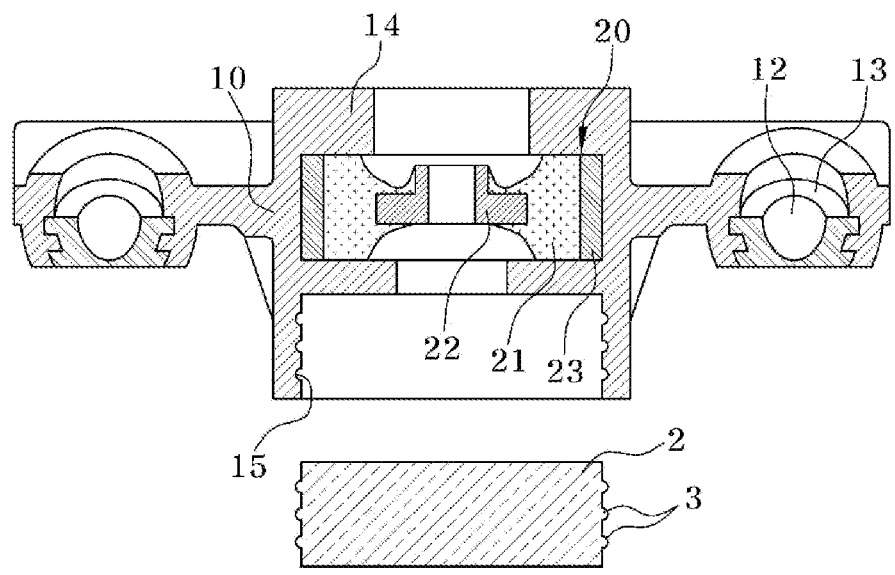
FIG. 4 is a diagram illustrating a housing and a mold of the insulator according to the exemplary embodiment of the present invention.
Figure 4:
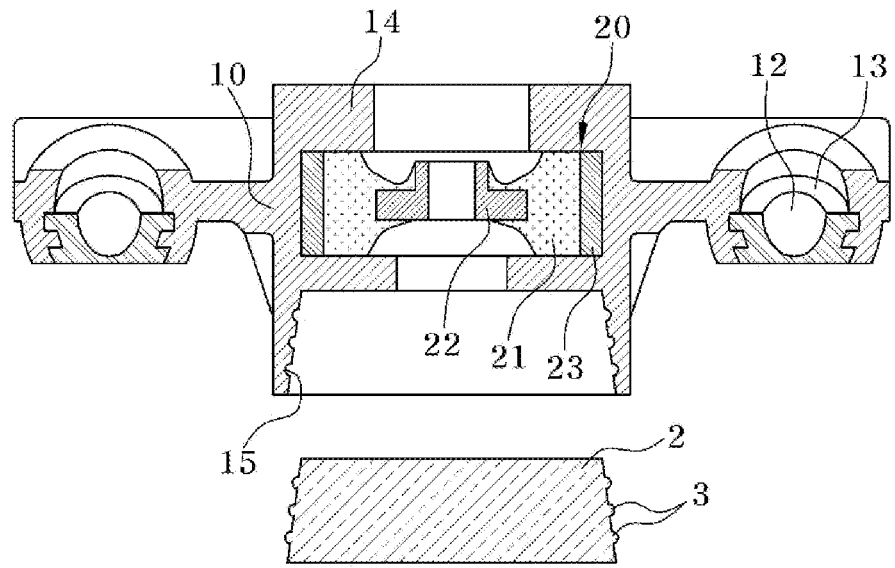

Thus, as shown in FIG. 4, the lower region, in which the protrusions or concave grooves 15 are at least formed in the housing 10, is formed in a shape having an inner diameter which is gradually increased toward a direction in which the mold 2 is separated (a mold separation direction thereof, that is, a downward direction in the drawing).

Similarly, at least a portion molding the lower region of the housing 10 among the surfaces of the mold 2 which molds the inner surface of housing 10 is formed in a shape of which outer diameter is gradually increased toward a lower side thereof.

Consequently, it is possible to reduce damage to the protrusions or the concave grooves 15 formed on the inner surface of the housing 10, to improve formability of the housing 10, and to ensure stable press-inserting quality and a bonding force between the housing 10 and the fixing plate 26.

In the present case, in a response to a variation in inner diameter of the housing 10, the fixing plate 26 press-inserted into the inner space of the housing 10 is also formed in a shape in which an outer diameter of the side surface portion 28 is gradually increased toward the lower side thereof.

However, a taper angle of the fixing plate 26 should be set such that the fixing plate 26 is capable of being press-inserted into the inner space of the housing 10, and the concave grooves or the protrusions 29 of the fixing plate 26 are capable of being engaged with the protrusions or the concave grooves 15 of the housing 10.

Figure 5:
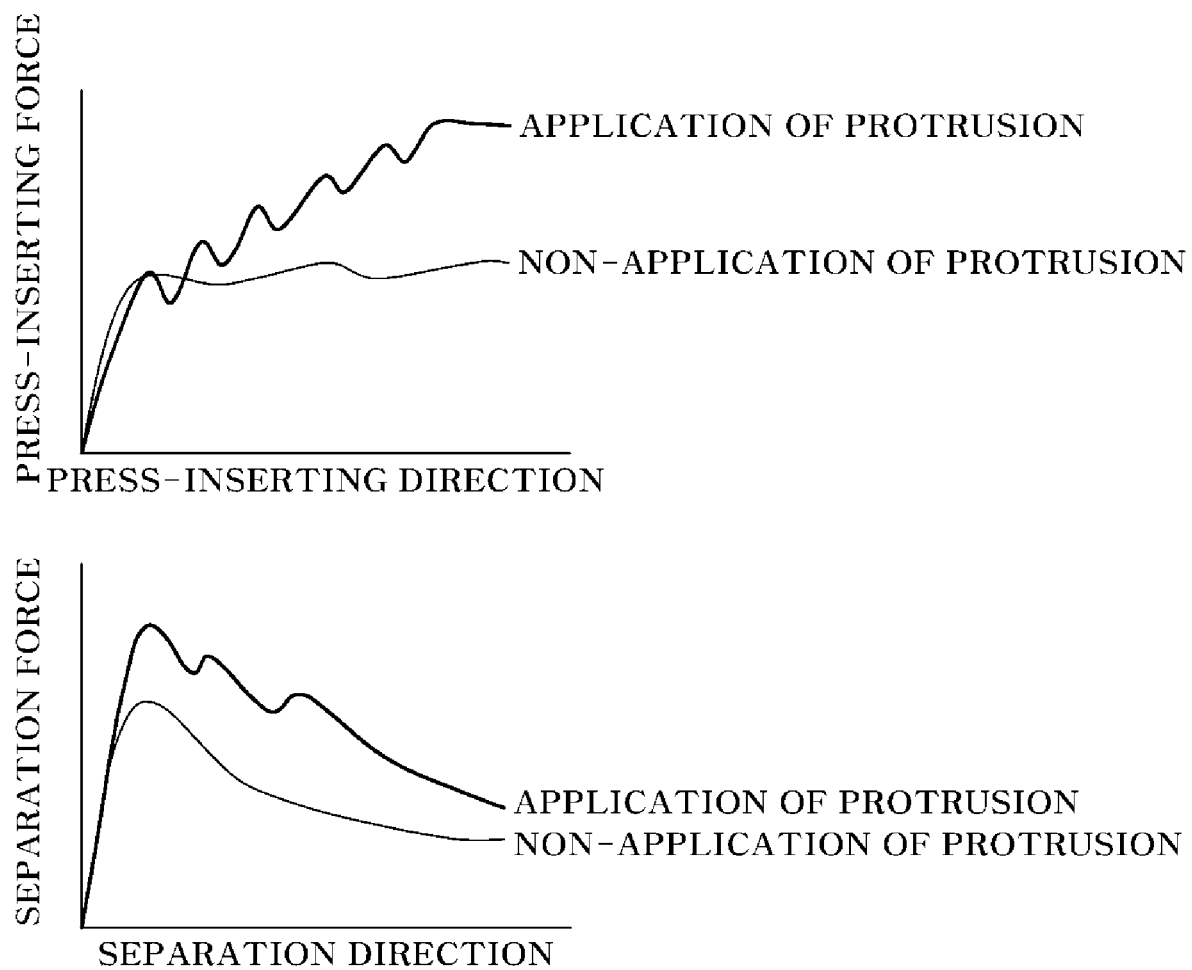
FIG. 5 shows graphs showing comparison of a case in which a protrusion is formed with a case in which the protrusion is not formed with respect to a press-inserting force and a separation force of the fixing plate according to an exemplary embodiment of the present invention.

FIG. 5 shows graphs showing comparison of a case in which a protrusion is formed on a fixing plate with a case in which the protrusion is not formed on the fixing plate with respect to a press-inserting force and a separation force of the fixing plate according to an exemplary embodiment of the present invention.

Here, the press-inserting force means a force required to press-insert the fixing plate 26 into the inner space of the housing 10, and the separation force means a force required for separating the fixing plate 26 press-inserted into the inner space of the housing 10 to an outer space of the housing 10.

As may be seen from the drawing, it may be seen that a case in which the protrusion 29 is formed on a bonding surface between the housing 10 and the fixing plate 26 has a press-inserting force and a separation force that are greater than those of a case in which the protrusion 29 is not formed on the bonding surface therebetween.

Furthermore, when the protrusion 29 is not formed, the fixing plate 26 is press-inserted into the housing 10 with a constant press-inserting force, whereas, when the protrusion 29 is formed, as the fixing plate 26 is more deeply press-inserted into the housing 10, a larger press-inserting force is required due to the protrusion 29.

Therefore, the separation force required for separating the fixing plate 26 is also required much more in the case in which the protrusion 29 is formed than the case in which the protrusion 29 is not formed. This exhibits that, when the protrusion 29 is formed, the fixing plate 26 is capable of being more stably fixed in the housing 10.

FIG. 6 is a cross-sectional view illustrating various examples of a bush in the insulator according to the exemplary embodiment of the present invention. In the load transfer path, since the bump stopper load is transferred from the fixing plate 26 to the outer pipe 23 of the bush 20, a shape of a contact surface between the fixing plate 26 and the outer pipe 23 is also important.

Figure 6A:
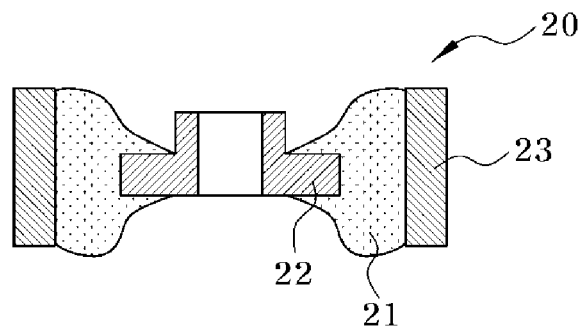
FIG. 6A, FIG. 6B and FIG. 6C are cross-sectional views illustrating various examples of a bush in the insulator according to the exemplary embodiment of the present invention.

As shown in FIG. 6A, when the outer pipe 23 of the bush 20 is a rectilinear cylindrical pipe shape having a constant diameter, since a size of a load transfer surface with the fixing plate 26 is small, deformation of the fixing plate 26 may occur.

Figure 6B:
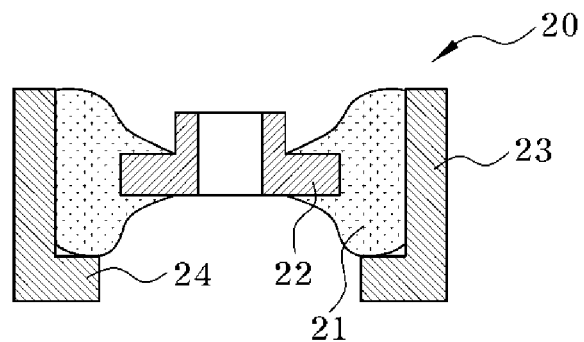
Figure 6C:
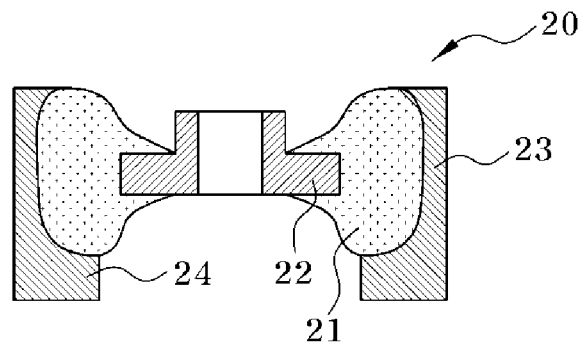

Therefore, as shown in FIGS. 6B and 6C, in an exemplary embodiment of the present invention, the shape of the outer pipe 23 is formed to increase a contact area with the fixing plate 26 to facilitate a load transfer of the outer pipe 23.

Referring to FIGS. 6B and 6C, in a shape of a lower portion of the outer pipe 23 in contact with the fixing plate 26, it may be seen an example in which an extension 24 is formed to have a shape protruding radially inward in the lower portion of the outer pipe 23 to surround a lower surface of the vibration-proof rubber 21.

The extension 24 is a portion which supports the bump stopper load transferred through the fixing plate 26 in a state of being in contact with the fixing plate 26 below the extension 24.

As described above, when the extension 24 is formed, as the contact area between a lower end portion of the vibration-proof rubber 21 and the fixing plate 26 increases, the load may be transferred from the bump stopper 31 to the fixing plate 26 through the increased contact area, and unlike the example of FIG. 6A, damage to the fixing plate 26 due to the outer pipe 23 may be definitely prevented.

As described above, in accordance with an insulator for a vehicle suspension according to an exemplary embodiment of the present invention, unlike a conventional insulator in which a housing is made of a metal such as an aluminum alloy or steel, a housing may be made of a synthetic resin so that there is an advantage of reducing a production cost and a weight as compared with the conventional insulator.

Furthermore, since a hook protrusion is formed in an upper end portion of the housing and a bush is press-inserted into an inner space of the housing through a bottom end opening of the housing from bottom to top, the conventional curling process may be omitted, and damage to a curling portion and a conventional problem due to the damage may be solved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of manufacturing an insulator for a vehicle suspension, the method comprising:
  providing a housing in which a hook protrusion is formed to protrude from an upper end opening of the housing;
  press-inserting a bush, in which a vibration-proof rubber, a core, and an outer pipe are integrally mounted, through a bottom end opening of the housing from bottom to top of the housing and fixing the bush in an inner space of the housing to be engaged upward to the hook protrusion; and
  press-inserting a fixing plate through the bottom end opening of the housing from bottom to top of the housing and fixing the fixing plate in the inner space of the housing so that the fixing plate is in contact with a lower end portion of the bush and supports the bush therebelow, wherein a bump stopper space, in which a bump stopper is located below the press-inserted fixing plate, is provided in the inner space of the housing.

2. The method of claim 1, wherein the housing is manufactured by being molded with a synthetic resin.

3. The method of claim 1, wherein the fixing plate includes:
an upper surface portion mounted to support the bush in a state of being in contact with a lower surface of the bush and having a hole formed to allow a piston rod coupled to the bush to pass therethrough; and
a side surface portion integrally formed to extend downwardly from a circumferential portion of the upper surface portion and coupled to an inner surface of the housing in a state of being in contact therewith.

4. The method of claim 3, wherein protrusions are formed to protrude from a surface of the side surface portion of the fixing plate to be in contact with the inner surface of the housing so that a bonding force between the housing and the fixing plate is increased due to the protrusions in a state in which the fixing plate is press-inserted into the inner space of the housing.

5. The method of claim 4, wherein concave grooves or protrusions configured to be engaged with the protrusions protruding from the surface of the side surface portion of the fixing plate of the fixing plate are formed on the inner surface of the housing in contact with the surface of the side surface portion of the fixing plate.

6. The method of claim 3, wherein protrusions are formed on the inner surface of the housing to be in contact with the side surface portion of the fixing plate, and concave grooves engaged with the protrusions of the fixing plate to be hooked thereto are formed on a surface of the side surface portion of the fixing plate to be in contact with the inner surface of the housing.

7. The method of claim 3, wherein:
in the bush, the outer pipe is press-inserted into and coupled to the inner surface of the housing in a state of being coupled to an outer surface of the vibration-proof rubber; and
an extension having a shape protruding radially inward is formed in a lower end portion of the outer pipe to surround a lower surface of the vibration-proof rubber so that the extension supports a bump stopper load transferred through the fixing plate in a state of being in contact with the fixing plate below the extension.

8. An insulator for a vehicle suspension, the insulator including:
a housing which is configured to be engaged with a vehicle body, wherein a hook protrusion is formed to protrude from an upper end opening of the housing;
a bush which is configured to be engaged with a piston rod of a shock absorber, wherein a vibration-proof rubber, a core, and an outer pipe are integrally mounted in the bush, and wherein the bush is press-inserted into and fixed in an inner space of the housing so that the bush becomes hooked upward to the hook protrusion; and
a fixing plate press-inserted into and fixed in the inner space of the housing so that the fixing plate is in contact with a lower end portion of the bush and supports the bush from a lower side thereof,
wherein a bump stopper space, in which a bump stopper is located below the press-inserted fixing plate, is provided in the inner space of the housing.

9. The insulator of claim 8, wherein the housing is formed of a synthetic resin.

10. The insulator of claim 8, wherein the fixing plate includes:
an upper surface portion mounted to support the bush in a state of being in contact with a lower surface of the bush and having a hole formed to allow a piston rod coupled to the bush to pass therethrough; and
a side surface portion integrally formed to extend downwardly from a circumferential portion of the upper surface portion and coupled to the housing in a state of being in contact with the housing.

11. The insulator of claim 10, wherein protrusions are formed to protrude from a surface of the side surface portion of the fixing plate to be in contact with the inner surface of the housing so that a bonding force between the housing and the fixing plate is increased due to the protrusions in a state in which the fixing plate is press-inserted into the inner space of the housing.

12. The insulator of claim 11, wherein concave grooves or protrusions configured to be engaged with the protrusions protruding from the surface of the side surface portion of the fixing plate are formed on the inner surface of the housing in contact with the surface of the side surface portion of the fixing plate.

13. The insulator of claim 10, wherein protrusions are formed on the inner surface of the housing to be in contact with the side surface portion of the fixing plate, and concave grooves engaged with the protrusions of the fixing plate to be hooked thereto are formed on a surface of the side surface portion of the fixing plate to be in contact with the inner surface of the housing.

14. The insulator of claim 10, wherein:
in the bush, the outer pipe is press-inserted into and coupled to the inner surface of the housing in a state of being coupled to an outer surface of the vibration-proof rubber; and
an extension having a shape protruding radially inward is formed in a lower end portion of the outer pipe to surround a lower surface of the vibration-proof rubber so that the extension is supported to transfer a load in a state of being in contact with the fixing plate below the extension.

* * * * *